United States Patent [19]

Flaig

[11] Patent Number: 5,174,448

[45] Date of Patent: Dec. 29, 1992

[54] CONTAINER FOR SHIPPING AND STACKING SHEETS OF GLASS

[75] Inventor: Victor L. Flaig, Rogers, Ark.

[73] Assignee: Guardian Industries Corp., Northville, Mich.

[21] Appl. No.: 872,365

[22] Filed: Apr. 23, 1992

[51] Int. Cl.[5] ............................................ B65D 81/02
[52] U.S. Cl. .................................. 206/386; 206/451; 206/453; 206/454; 206/503
[58] Field of Search ............... 206/321, 322, 386, 449, 206/451, 453, 454, 503

[56] References Cited

U.S. PATENT DOCUMENTS

| | | | |
|---|---|---|---|
| 2,738,058 | 3/1956 | Hansen et al. | 206/451 |
| 2,746,667 | 5/1956 | Murphy | 206/454 |
| 2,811,249 | 10/1957 | Swain et al. | 206/454 |
| 2,974,844 | 3/1961 | Lane | 206/453 |
| 3,133,687 | 5/1964 | Fremion | 206/454 |
| 3,308,941 | 3/1967 | Kean, Sr. et al. | 206/453 |
| 3,438,488 | 4/1969 | Rohde | 206/454 |
| 3,603,455 | 9/1971 | Bareiss | 206/454 |
| 3,805,473 | 4/1974 | Lidgard | 206/451 |
| 4,072,230 | 2/1978 | Mulligan | 206/454 |
| 5,105,946 | 4/1992 | McDowell | 206/454 |

OTHER PUBLICATIONS

Exhibit A, drawings of regular and tall known crates.
Exhibit B, drawings of known cardboard crates.

*Primary Examiner*—Jimmy G. Foster
*Attorney, Agent, or Firm*—Myers, Liniak & Berenato

[57] ABSTRACT

A recyclable and reusable container for shipping and stacking glass sheets includes a creased recyclable cardboard piece forming the rear and two sides of the container, with underflaps connected to a reusable wooden pallet; an easily removable front wall without underflaps and made of the same recyclable cardboard; recyclable cardboard corner posts and recyclable cardboard cross-members resting on top of the glass sheets flush with the top of the container. The container, without vertical wooden or metal structures, can support other containers filled with glass sheets stacked on top due, in part, to the use of the glass sheets as load-bearing members during stacking.

10 Claims, 2 Drawing Sheets

CONTAINER FOR SHIPPING AND STACKING SHEETS OF GLASS

FIELD OF THE INVENTION

This invention relates to containers for shipping and stacking sheets of glass. More particularly, this invention relates to containers which are substantially recyclable and reusable after shipping and/or stacking glass sheets therein.

BACKGROUND

Sheets of glass, either in simple sheet form or in more complex forms, are particularly subject to damage during shipping. In addition, because of the nature of glass manufacturing operations and the economies of scale attendant continuous production, sheet glass, once cut to size and/or formed into special items [such as insulating, sealed double (or more) panes] to be used in insulating glass windows, often must be warehoused in inventory. The amount and expense of warehouse space required would be prohibitive if the glass sheets could not be packaged in containers and stacked two or more containers high.

In order to accommodate these needs, the glass manufacturing industry has devised numerous types of stackable containers. Generally speaking, the most popular of these containers employ wooden or metal decks, called pallets, to which are attached two or more fence-like vertical walls of wood or metal. Glass sheets placed in these containers are shorter than the walls, so that when one container is stacked upon another, the container's walls become the load-bearing members in the stacked system. While such containers were at times wrapped in cardboard, and/or metal straps or large widths of fiberglass reinforcing tape for better lateral integrity, the weight and expense of providing the heretofore believed necessary metal or wooden fence-like vertical load-bearing walls was less than desirable. In addition, such containers were difficult to disassemble and were often rendered unusable, even in part, by the end user (e.g. the fabricator of the final product from the glass sheets) through disassembly. If partially reusable, it was usually only reusable by the first user, i.e. the glass manufacturer, thus necessitating the costs attendant having to ship back the reusable part (e.g. the pallet deck), along with the care required in disassembly to make sure it would be reusable. In all of these early designs it was usually considered detrimental or not feasible to use the glass sheets as a partial load-bearing member during stacking.

In an earlier design by the subject inventor and others at the inventor's assignee company, a structure was devised which eliminated the need for heavy, upstanding, fence-like walls of wooden boards or metal pipes. This container employed multiple walls of very heavy (e.g. 1500–1800 lb. test) corrugated cardboard, such that one wall formed a tube within a tube with regard to the other walls . . . usually a total of three in number. By using appropriate creasing and underflaps for attachment to the wooden pallet, all four sides of the container were provided with a multiwalled corrugated cardboard structure having four underflaps (one for each side, including the front wall). With lateral stability provided by the glass sheets, the container walls, a "cap" top and wraparound metal strips, the container was strong enough to be stacked up to four or more containers high. Like past containers, however, the walls of the container were designed to extend above the glass sheets so as to insure that during stacking the glass sheets would bear none of the vertical loads caused by the stacking.

This latter design, while a significant technical improvement in the art, turned out to be less than fully successful, primarily for certain significant practical reasons. First, the cardboard employed was very heavy and rather expensive. Secondly, assembly of a tri-walled structure employing two inner walls was somewhat arduous. Thirdly, and perhaps most importantly, was the fact that it was rather difficult to disassemble from the final user's perspective, who had to first remove the front face of the container, while leaving the rest of the sides intact so he could unload the glass sheets from the container.

In view of the above, it is apparent that there exists a need in the art for a container for sheets of glass which is stackable, and yet which overcomes the above problems attendant prior containers. It is a purpose of this invention to fulfill this and other needs in the art, which will become more apparent to the skilled artisan once given the following disclosure:

SUMMARY OF THE INVENTION

Generally speaking, this invention fulfills the above-described needs in the art by providing a stackable, substantially rectangular container for shipping sheets of glass wherein the glass sheets, when placed in the container, form load-bearing members when one container is stacked upon another, the container comprising: a reusable base pallet; a first integral sheet of recyclable corrugated cardboard creased appropriately so as to form two sides and the rear wall of the container, as well as three bottom flaps for connecting the sheet to the pallet; a second sheet of recyclable corrugated cardboard, this second sheet forming the front wall of the container, generally L-shaped corner posts of recyclable corrugated cardboard for each corner of the container, and horizontal cross-member means of recyclable material extending between two opposing walls of the container, and located on top of the glass sheets when placed in the container so as to bear a portion of the load of another container when stacked thereupon, thereby transferring a portion of the load into the glass sheets, whereby the glass sheets bear a portion of the load caused by the stacking.

In certain preferred embodiments, the second sheet of recyclable corrugated cardboard is uncreased and has no bottom flap associated therewith, and the cross-members are themselves recyclable corrugated cardboard preferably formed of a stacked plurality of laminated (e.g. glued together) elongated strips of tri-walled corrugated cardboard, each member forming a beam-like structure. With regard to the second sheet, which thus forms the front wall of the container, an easily opened container is provided to the end user. With regard to the elongated beam-like cross-member of corrugated cardboard (preferably with the cylinders of corrugation extending in the direction of elongation of the beam) by making each of them thick enough so that, resting on the top edges of the glass, the top surface is in substantially the same plane as the top of the walls, these cross-members bear their fair share of the load of another container stacked on top, thus imparting this load to the glass sheets on which these cross-members rest.

In certain further preferred embodiments, the pallet employed is of a conventional wooden board design, but is of such a dimension so as to be reusable by the fabricator of the glass sheets to ship his final product (i.e. framed windows), thus eliminating the need to return it to the glass manufacturer. The size of the glass sheets contained, and thus the size of the container and type of cardboard employed, may vary greatly. For example, for items such as conventional single glass sheets or insulating double-pane glass sheets in which 22"×64" insulated double-pane glass units of $\frac{1}{2}$" thick glass are vertically stacked in upstanding relationship, back-to-front (i.e. their top edges running side-to-side), conventional 1100 lb. test, tri-walled corrugated cardboard has been found quite adequate in most instances. In addition, cross-members of this material having approximately 12 strips glued together, and their attendant thickness, have been found to form excellent cross-members for the purposes of this invention for single or multiple rows of glass sheets. Another example where 1100 lb. test corrugated, tri-walled cardboard and a 10-14 strip corrugated beam is found advantageous is in a container holding two rows of 50 pieces (each) 22"×36"×$\frac{1}{2}$" insulating glass panes.

This invention will now be described with respect to certain embodiments thereof as illustrated in the following drawings wherein:

IN THE DRAWINGS

DETAILED DESCRIPTION OF THE DRAWINGS

Figure 1:
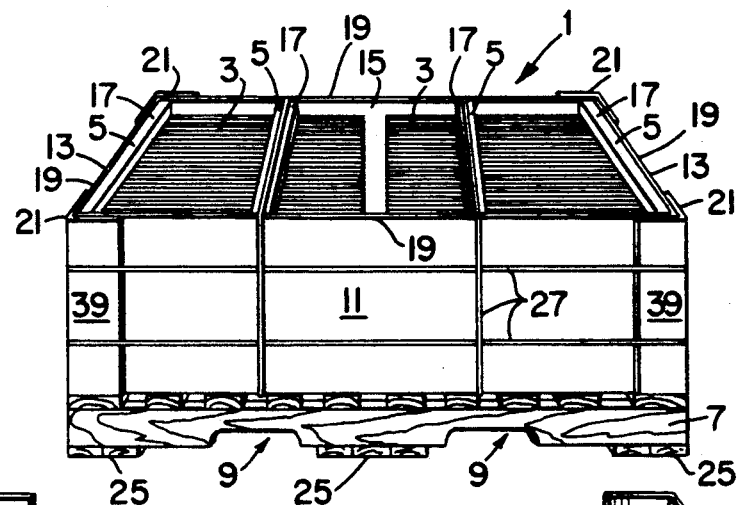
FIG. 1 is a front perspective view of an embodiment of this invention.

With reference initially to FIG. 1, there is illustrated an embodiment of a container 1 as contemplated by this invention. As can be seen, container 1 has located therein two rows of approximately 50 sheets of glass 3. These glass sheets may be simple sheets of glass or may be of a more exotic nature, such as a double-paned or triple-paned insulated glass sheets having a vacuum between the various sheets which are sealed to contain the vacuum around their peripheral edges. Typical sizes of such glass articles are 22"×36"×$\frac{1}{2}$".

In this respect, it is understood that containers in accordance with this invention may have only one row of glass sheets, or may have more than two rows, the double-rowed embodiment being shown here for convenience, rather than limitation. When single rows are employed, a typical glass sheet size is 22"×64"×$\frac{1}{2}$". It is also understood that if two or more rows are used, then between the rows, usually at the bottom of the glass sheets, there will be a spacer located between the rows to separate the rows and prevent them from banging together during shipment. (These spacers, not shown for convenience, may be of any known type or may be, for convenience of inventory, simply one or more cross-members 5 wedged down between the rows.)

Forming the deck (or base) of the container is a conventional wooden pallet 7 formed of longitudinal and lateral boards and having in its front face cutouts 9 for use by forklift trucks for lifting, loading and unloading container 1. On top of pallet 7 there is located surrounding corrugated cardboard walls in which there is provided front wall 11, left and right side walls 13, and rear wall 15.

Four cross-members 5 extend from front wall 11 rearwardly to rear wall 15 and rest upon the top surface of glass sheets 3. There is nothing critical about the number of cross-members 5 employed, as more or less may be used as a particular situation may render applicable. The top surface 17 of each of cross-members 5 is designed to be, by way of the thickness of cross-member 5, flush with the top surfaces 19 of all four walls, as well as the top surface 21 of the four corner posts 23. Because the top surfaces 17 of all four cross-members 5 reside in substantially the same horizontal plane as the top surfaces 19 of the walls and the top surface 21 of the corner posts, when one container is stacked upon another such that, for example, the bottom boards 25 of one pallet 7 come to rest upon the aforesaid top surfaces 17, 19, and 21, as well as cross-members 5, cross-members 5 take up their fair share of the stacked loading and transmit the same into the top surfaces of glass sheets 3, such that glass sheets 3 become integral load-bearing members of container 1 for stacking purposes. Lateral integrity is thereafter maintained for shipment and stacking purposes by employing conventional wrap-around metal straps or fiberglass reinforced tapes 27.

In certain embodiments, of course, it is understood that it may be desirable to provide a capped top in conventional fashion. However, it has been found in most circumstances that such a capped top (which would also be made out of creased and appropriately formed corrugated cardboard) is not needed, and the structure shown in FIG. 1 is sufficient for both shipping and stacking in accordance with the contemplated uses of this invention.

The structure shown in FIG. 1 and more fully illustrated in the remaining figures has been found to be uniquely applicable in that it is not only simple to open and remove the glass from, but it is also quite simple to assemble, stack the glass in, and thereafter provides the necessary strength for stacking in two, three, four or more stacked configurations, one container upon the other. Because of its nature, furthermore, little damage is done to the pallet during disassembly, so that it is fully reusable. Since the corrugated cardboard is recyclable and there are no wooden or metal walls to scrap, the container, except for the metal straps (or tape, and perhaps a few nails or staples), is fully recyclable or reusable.

Figure 2:
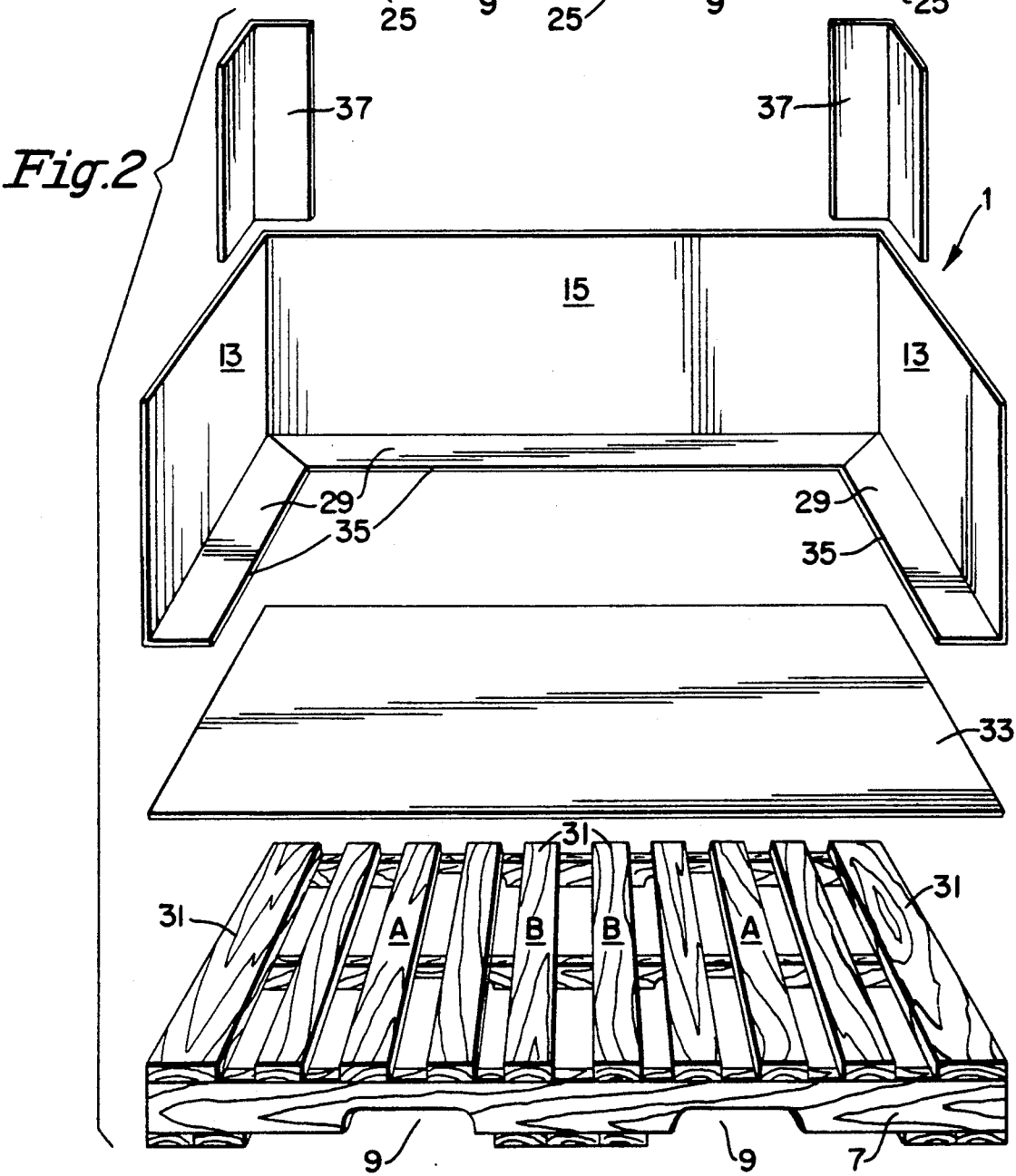
FIG. 2 is a partial, exploded perspective view of the embodiment of FIG. 1.

Turning now to FIG. 2, the partial, exploded view of container 1 found in FIG. 1, a better view of how the container is constructed is illustrated. As can be seen, side and rear walls 13 and 15, respectively, are formed of an integral form best illustrated in its unfolded position in FIG. 3. As further illustrated, this form is provided with underflaps 29 for attachment of the walls to pallet 7 by way of stapling or nailing the same to the pallet. For example, one inch nails may be used quite adequately to nail the three underflaps (flanges) 29 to the top boards 31 of pallet 7. In this respect, underflaps 29 are usually made large enough (e.g. approximately 6 inches) so that the ends of glass sheets 3 will reside thereon. This cushions the ends of sheets 3 and prevents them from directly contacting the harder wood of the upper boards 31 in pallet 7. Some cushioning, therefore, must be provided for the remainder of each glass sheet 3 as it extends inwardly from sides 13 toward the center of container 1. This may be done in several ways, one of which is illustrated in FIG. 2. Here, item 33 is a simple pad of corrugated cardboard provided as an insert having dimensions slightly less than the rectangle defined by the inner peripheral edges 35 of underflaps 29. This may simply be located on top boards 31 of pallet 7 or may be secured thereto by way of staples or the like. The thickness thereof, of course, would be substantially the same thickness as that of underflaps 29. An alternative to the use of a cardboard sheet 33 would be the use of strips of cushioning material located on some of the top boards 31 of pallet 7 that are internal of the peripheral inner edges 35 of underflaps 29. Such strips are not shown, for convenience, and would be located, for example, along alternate boards such as boards A and B. Examples of such cushioning strips are strips such as those sold by Homasote of Trenton, N.J. under the trade designation PACKLINE STRIPS. These strips, of course, should be of substantially the same thickness as the thickness of underflaps 29.

Also illustrated in FIG. 2 are two of the four substantially L-shaped corner posts 37, which are preferably formed of the same corrugated cardboard as walls 13 and 15. These corner posts 37 serve to reinforce the corners and provide further upstanding load-bearing support for the structure. They are conveniently glued or otherwise attached to the outside surfaces of the walls at the four junctions between rear wall 15, right and left side walls 13, and front wall 11.

Figure 3:
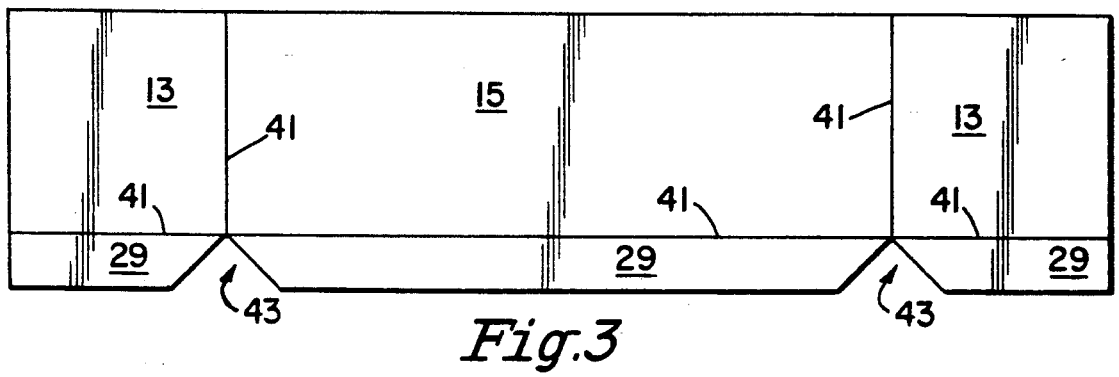
FIG. 3 is a top plan view of the creased, underflapped rear and side wall form of the embodiment of FIG. 1.

Not shown in FIG. 2, but shown in FIG. 3, is the simple nature of front wall 11 as illustrated in FIG. 1. In this respect, front wall 11 is preferably made of the same corrugated cardboard as are walls 13 an 15 (i.e. the blank form as illustrated in FIG. 3) but has no creases in it, nor does it have any underflap. Front wall 11 is merely assembled into the system after glass sheets 3 are stacked therein by locating it against the glass sheet (with or without a spacer therebetween, as desired) and gluing front flaps 39 of the two forwardmost corner posts 37 to the front face of front wall 11, thereby simply securing an easily removable door which allows easy removal of the glass sheets therefrom by the end user.

Figure 4:
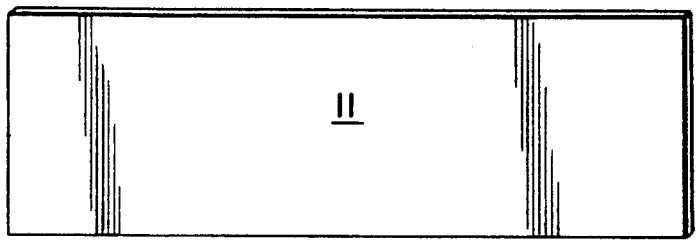
FIG. 4 is a front perspective view of the uncreased, non-flapped front wall of the embodiment of FIG. 1.

With reference now more particularly to FIG. 3, it can be seen that the form used for walls 15 and 13 is an integral continuous form which also has integrally located therein the necessary underflaps 29. This is done in conventional fashion by forming various creases 41 and appropriately designed cutouts 43 so as to form the walls and underflaps as illustrated in FIG. 2 when easily folded during assembly. Once again, it is to be noted, however, that in the form for the front wall 11 as illustrated in FIG. 4, no such creases or underflaps are provided.

The skilled artisan will, of course, design his structure to be strong enough to handle the anticipated stacked loads, as well as shipping loads, to be experienced for any particular situation. It has been found, in this respect, that in the preferred embodiments of this invention wherein glass sheets of a conventional window or double-paned window size are to be employed, particularly for example when there are to be two rows of glass sheets 3, as illustrated in FIG. 1, each to have 50 glass sheets therein, that triple-walled corrugated cardboard having an 1100 lb. test strength certification has been found to be more than adequate to handle the loads normally anticipated in such a pallet as illustrated, or in various pallets of various sizes conventional in the art. Such triple-walled corrugated cardboard is conventional in the industry and is made, for example, by Union Camp Corporation and is designated by its test strength, as well as by its triple "tri-walled" nature.

Figure 5:
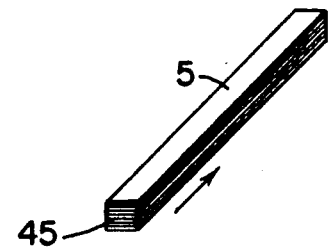
FIG. 5 is a perspective view of an embodiment of a cross-member as contemplated by this invention.
Figure 5A:
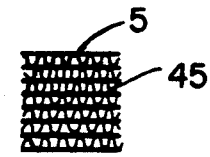
FIG. 5A is a partial exploded end view of the cross-member of FIG. 5.

Turning now to FIGS. 5-5A, there is illustrated a preferred cross-member 5 according to this invention. As can be seen, cross-member 5, in the preferred forms, is made of a stacked layer of tri-walled corrugated strips which, as seen by way of its end face 45 as illustrated in FIG. 5A has its corrugations extending in the longitudinal direction of the cross-member. This is illustrated by the arrow in FIG. 5 and thereby is provided an excellent cushioning and strengthening cross-member. As illustrated in FIG. 1, when cross-member 5 is located on top of the glass sheets (there being two cross-members 5 for each row of glass) there is provided the necessary beam-like structure which transmits a portion of the vertical loading occasioned by stacking of one pallet upon the other, into glass sheets 3 such that glass sheets 3 become a part of the load-bearing structure of container 1. In this respect, it has been found that adequate strength and cushioning effect exists for most purposes in cross-member 5 if the same tri-walled 1100 lb. test corrugated cardboard is used, and 10-14 (preferably approximately 12) strips are employed and glued together to make up the structure illustrated in FIGS. 5 and 5A.

Figure 6:
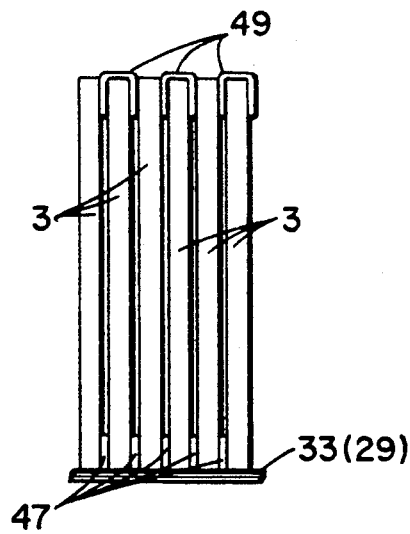
FIG. 6 is a fragmentary cross-section illustrating the vertical, upstanding arrangement of glass sheets when located in the container of FIG. 1.

FIG. 6 illustrates in partial form a preferred manner of locating the glass sheets in the container in an upright, vertical position. As illustrated therein, pad 33 (or if at the edges, underflap 29 of side walls 13) is located for cushioning purposes beneath each of sheets 3. In the alternative, and as stated above, items 33 may be replaced by PACK-LINE STRIPS located on any of the top boards 31, but preferably on alternating boards such as A and B as illustrated in FIG. 2. Then, in order to maintain the relative pristine nature of the front an rear surfaces of sheets 3, conventional spacer wrappings are provided, which usually are nothing more than simple corrugated cardboard spacers 47 located between each of the bottom edges of sheets 3, and alternating corrugated U-shaped spacers 49 located on alternating sheets 33 at the top. Because cross-members 5 extend front-to-back, while the glass sheets run from side-to-side, the bottom surface of cross-members 5 reside on the top surface of alternating spacers 49, thereby providing additional cushioning and protecting all top surfaces of glass sheets 3.

One of the unique features of this invention is that the product as illustrated is substantially reusable and recyclable, with only metal straps 27 (or fiberglass reinforcing tape, if used as an alternative thereto) and the staples or nails not being either recyclable or reusable. In this respect, it can be seen that by eliminating all upstanding metal wooden fence-like structures, the problems associated therewith have been eliminated. The only upstanding structures, then, in this respect, for load-bearing purposes are recyclable cardboard structures. The only remaining portion, then, of container 1 is pallet 7 which, because it has only had stapled or nailed into it cardboard flaps 29 (or pad 33) is not destroyed when these cardboard materials are easily removed from it. Thus, if properly designed to be of a given prescribed dimension by the end user, pallet 7 may now be used by the end user as a valuable piece of inventory wherein, after he finishes fabricating the glass sheets into the final window product (with a frame, etc. attached thereto), he may now use this same pallet 7 to ship his product. While, at times, it is envisioned within the confines of this invention that the cardboard walls may also be reusable by the end user and need not be recycled, in most instances the cardboard will be disposed of through recycling, and the end user will not reuse it when he packages his final window or other product.

As can be seen from the above, an easily usable, easily assembled, stackable, substantially recyclable and reusable product has been formed by this invention without the use of overly heavy cardboard and which, in total, substantially overcomes the problems heretofore experienced in the prior art. Once given the above disclosure, therefore, other features, modifications and improvements will become apparent to the skilled artisan. Such other features, modifications and improvements are considered to be a part of this invention. the scope of which is to be determined by the following claims:

I claim:

1. A stackable, substantially rectangular container for shipping sheets of glass wherein said glass sheets, when placed in said container, form load-bearing members when one container is stacked upon another, said container comprising:
   a reusable base pallet;
   a first integral sheet of recyclable corrugated cardboard creased appropriately so as to form two sides and the rear wall of said container, as well as three bottom flaps for connecting said sheet to said pallet;
   a second sheet of recyclable corrugated cardboard, said second sheet forming the front wall of said container;
   generally L-shaped corner posts of recyclable corrugated cardboard for each corner of said container; and
   horizontal cross-member means of recyclable material extending between two opposing walls of said container and located on top of said glass sheets when placed in said container, so as to bear a portion of the load of another container when stacked thereupon, thereby transferring a portion of said load into said glass sheets, whereby said glass sheets bear a portion of the load caused by said stacking.

2. A container according to claim 1 wherein said second sheet of recyclable corrugated cardboard is uncreased and has no bottom flap associated therewith, and wherein said cross-member means consists essentially of recyclable corrugated cardboard.

3. A container according to claim 2 which further includes at least one metal strap wrapped around a periphery of said container.

4. A container according to claim 3 wherein said corrugated cardboard comprises at least 1100 lb. test cardboard.

5. A container according to claim 4 wherein said container is capable of being stacked four containers high.

6. A container according to claim 4 wherein said container is of a shape to contain a plurality of double-paned insulating glass windowpanes resting side-by-side, and said pallet is of a size and shape so as to be reusable as shipping pallet for framed insulated windows made from said panes.

7. A container according to claim 6 wherein said pallet is made of wood boards.

8. A container according to claim 1 wherein said horizontal cross-member means consists essentially of a plurality of elongated strips of corrugated cardboard stacked one on top of the other and wherein said corrugations extend in the longitudinal direction of said strips thereby to form a beam-like structure, which structure is of sufficient length so as to extend across substantially the entire width of said glass sheets.

9. A container according to claim 8 wherein said horizontal cross-member means are designed to rest upon and extend in a direction so as to be perpendicular to the top edges of the glass sheets when located therein, and wherein said container is designed so that said glass sheets are to be located in a vertical, upstanding position within said container.

10. A container according to claim 9 wherein said stack of elongated strips of corrugated cardboard is of a sufficient thickness so that when located on top of said glass sheets, the top surface of said stack is in substantially the same horizontal plane as the top of the walls of said container and said L-shaped corner posts thereby to provide a load-bearing surface for another container when stacked thereupon.

* * * * *